(12) United States Patent
Peng et al.

(10) Patent No.: US 11,505,489 B2
(45) Date of Patent: Nov. 22, 2022

(54) ISOTHERMAL DROP SPEED COOLING METHOD OF FORCED CONVECTION AREA FOR LEHR AND THE APPARATUS THEREOF

(71) Applicant: China Triumph International Engineering Co., Ltd., Shanghai (CN)

(72) Inventors: Shou Peng, Shanghai (CN); Xing Yi, Shanghai (CN); Rui Liu, Shanghai (CN); Ming Cheng, Shanghai (CN); Yuan Liu, Shanghai (CN)

(73) Assignee: CHINA TRIUMPH INTERNATIONAL ENGINEERING CO., LTD., Shanghai (CN)

( * ) Notice: Subject to any disclaimer, the term of this patent is extended or adjusted under 35 U.S.C. 154(b) by 637 days.

(21) Appl. No.: 15/322,147

(22) PCT Filed: Apr. 29, 2015

(86) PCT No.: PCT/CN2015/077770
§ 371 (c)(1),
(2) Date: Mar. 30, 2017

(87) PCT Pub. No.: WO2015/196862
PCT Pub. Date: Dec. 30, 2015

(65) Prior Publication Data
US 2017/0247280 A1   Aug. 31, 2017

(30) Foreign Application Priority Data

Jun. 24, 2014   (CN) .......................... 201410286520.3

(51) Int. Cl.
*C03B 25/08*   (2006.01)
(52) U.S. Cl.
CPC ................... *C03B 25/08* (2013.01)

(58) Field of Classification Search
CPC ..................................................... C03B 25/08
See application file for complete search history.

(56) References Cited

U.S. PATENT DOCUMENTS 3,223,500 A * 12/1965 Mission ................. B21C 47/34
239/601
3,251,671 A *  5/1966 Gardon .................. C03B 25/04
65/118
(Continued)

FOREIGN PATENT DOCUMENTS

CN        203187552 U    9/2013
CN          2615128 Y    5/2014
(Continued)

OTHER PUBLICATIONS

Tian, Y. et al. "Numerical study on nozzle-field cooling of heated aluminum blanks for hot-stamping" (2018) Procedia Manufacturing 15, pp. 1134-1141.*

*Primary Examiner* — Queenie S Dehghan
(74) *Attorney, Agent, or Firm* — Global IP Services; Tianhua Gu

(57) ABSTRACT

An isothermal drop speed cooling method and an apparatus for same. A glass ribbon carried with glass passes through the forced convection area of the glass annealing lehr, and the glass ribbon is moving while the glass is being air-cooled in the forced convection area. The glass is air-cooled by different air volume according to the temperature of the glass, so that the glass is allowed to be cooled at isothermal drop speed during the moving process of the glass. According to the cooling method and apparatus, the specification size of the opening section of multi-row air nozzles longitudinally arranged is increased along the moving direction of the glass ribbon, so that the cooling air volume from the (Continued)

front to the rear can be gradually increased, thereby allowing the temperature drop speed of a glass plate to be uniform from the front to the rear.

4 Claims, 3 Drawing Sheets

(56) References Cited

U.S. PATENT DOCUMENTS

| | | | | |
|---|---|---|---|---|
| 4,171,966 A * | 10/1979 | Baron | ............ | C03B 5/183 |
| | | | | 65/100 |
| 4,204,845 A * | 5/1980 | Shields | ............ | C03B 27/0404 |
| | | | | 65/114 |
| 4,311,507 A * | 1/1982 | Starr | ............ | C03B 27/048 |
| | | | | 65/104 |
| 4,578,102 A * | 3/1986 | Colmon | ............ | B05B 7/0416 |
| | | | | 65/114 |
| 5,209,767 A * | 5/1993 | Maltby, Jr. | ............ | C03B 25/093 |
| | | | | 65/162 |
| 7,320,187 B2 * | 1/2008 | Bancon | ............ | C03B 25/08 |
| | | | | 34/620 |
| 2004/0107733 A1 * | 6/2004 | Yashizawa | ............ | C03B 27/004 |
| | | | | 65/348 |

FOREIGN PATENT DOCUMENTS

| | | | |
|---|---|---|---|
| CN | 103922575 A | | 7/2014 |
| CN | 104016576 A | | 9/2014 |
| WO | WO-2011122678 A1 * | 10/2011 | ........... C03B 27/012 |

\* cited by examiner

ISOTHERMAL DROP SPEED COOLING METHOD OF FORCED CONVECTION AREA FOR LEHR AND THE APPARATUS THEREOF

BACKGROUND OF THE PRESENT INVENTION

Field of Invention

The present invention relates to the technical field of glass annealing, in particular to an isothermal drop speed cooling method of a forced convection area of a glass annealing lehr.

Description of Related Arts

A forced convection area of a glass annealing lehr mainly comprises a hot air circulating forced convection cooling area and a cold air forced convection cooling area.

In the current convection area cooling technologies of the glass annealing lehr, multiple rows of air nozzles are arranged at upper part and lower part of a glass ribbon, the air nozzles are supplied with air through air blowers, and hot air or room-temperature cold air is used to blow a glass plate for gradually cooling.

In a front-to-rear cooling process of the glass ribbon, front temperature is higher and rear temperature is lower, while temperature and volume of cooling air are constant. As a result, front-to-rear cooling speed of glass is high at the front and low at the rear. This is not in compliance with an ideal glass temperature drop system.

SUMMARY OF THE PRESENT INVENTION

The present invention aims at overcoming the disadvantages of the above-mentioned annealing technology and provides an isothermal drop speed cooling method of a forced convection area of a glass annealing lehr.

In order to achieve the above-mentioned purpose, an aspect of the present invention provides an isothermal drop speed cooling method of a forced convection area of a glass annealing lehr. In the method, a glass ribbon carried with glass passes through the forced convection area of the glass annealing lehr, and the glass ribbon is moving while the glass is being air-cooled in the forced convection area. The glass is air-cooled by different air volume according to the temperature of the glass, so that the glass is allowed to be cooled at isothermal drop speed during the moving process of the glass.

Another aspect of the present invention provides an isothermal drop speed cooling apparatus for a forced convection area of a glass annealing lehr, comprising: a glass ribbon for placing glass to be cooled thereon; conveying rollers for moving the glass ribbon; and a cooling unit for cooling the glass on the glass ribbon along with the moving of the glass ribbon. The cooling unit is configured to provide different air volume according to glass temperature to air-cool the glass.

According to the cooling method and apparatus provided in the present invention, the specification size of the opening section of multi-row air nozzles longitudinally arranged is increased, so that the cooling air volume from the front to the rear cab be gradually increased, thereby allowing the temperature drop speed of a glass plate to be uniform from the front to the rear. The present invention improves the phenomenon that the cooling speed of the traditional glass ribbon is high at the front and low at the rear.

The essence of the present invention will be described below with reference to the drawings in combination with examples, so as to clearly understand other aspects and advantages of the present invention.

BRIEF DESCRIPTION OF THE DRAWINGS

The above-mentioned and other features and advantages of the present invention may be more clearly understood with reference to the drawings in combination with the detailed description below, wherein.

DETAILED DESCRIPTION OF THE PREFERRED EMBODIMENTS

The present invention will be described below in more detail with reference to the drawings of the specific embodiments of the present invention. However, the present invention may be implemented in many different manners and shall not be understood as limited by the embodiments provided herein. Contrarily, these embodiments are provided in order to achieve full and complete disclosure and enable one skilled in the art to fully understand the scope of the present invention.

Figure 1:
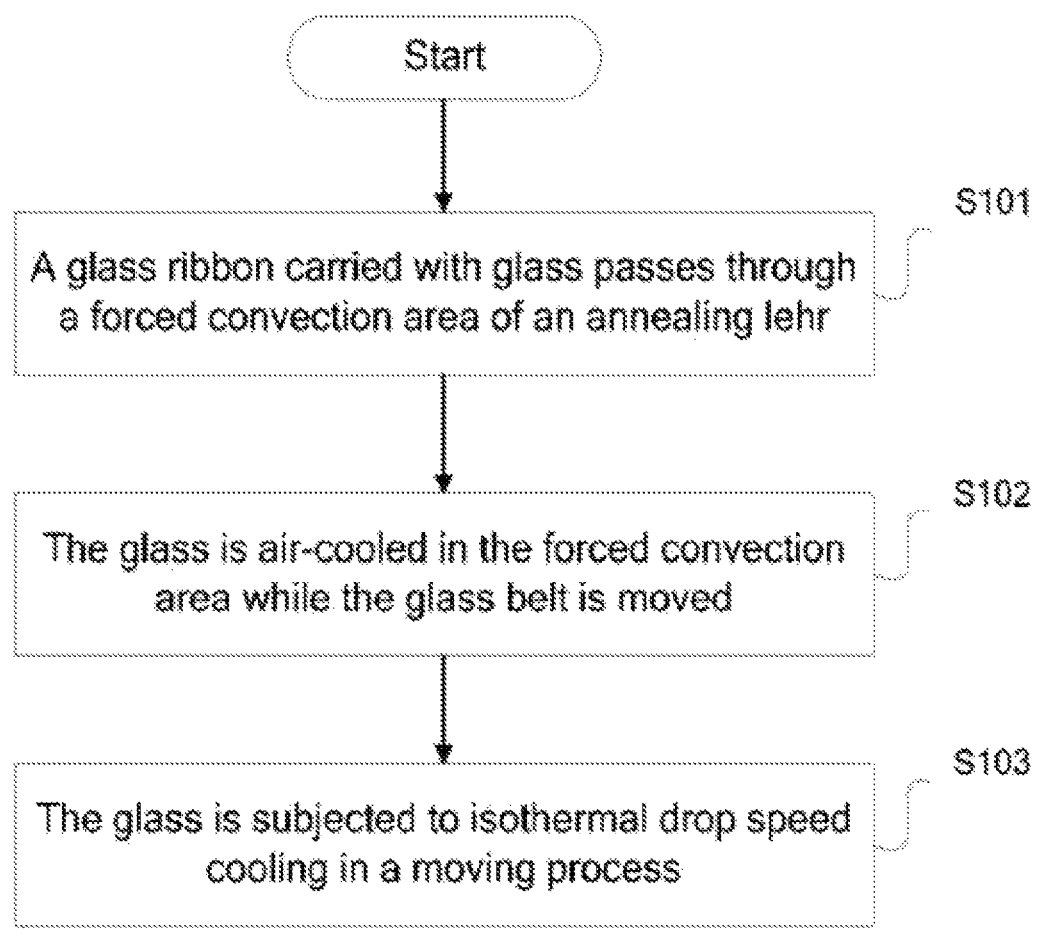
FIG. 1 illustrates a flowchart of a cooling method according to an embodiment of the present invention.
Figure 2:
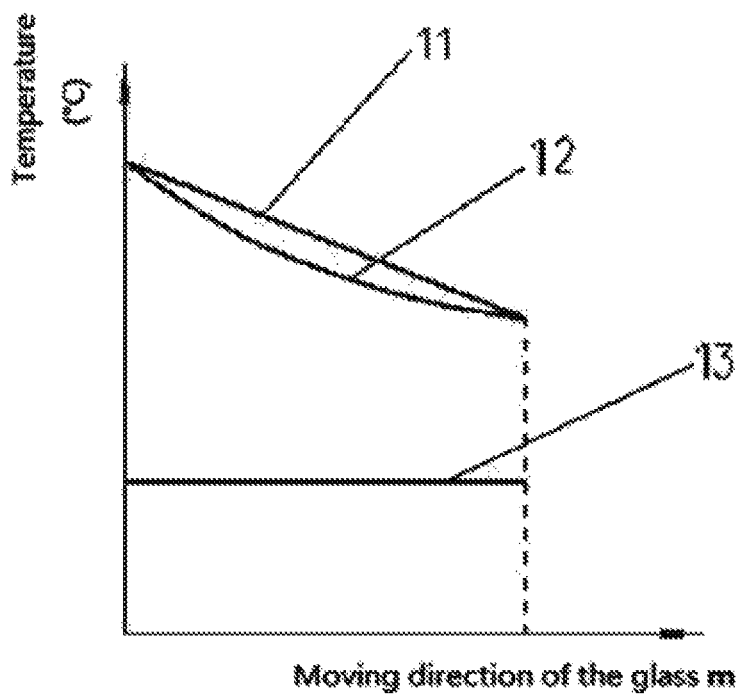
FIG. 2 illustrates a glass temperature drop curve chart of the cooling method according to the embodiment of the present invention.

With reference to FIG. 1 and FIG. 2, an isothermal drop speed cooling method of a forced convection area of a glass annealing lehr according to the present invention will be described in details. This method achieves the purpose of air cooling by blowing air to glass which passes through the forced convection area of the annealing lehr.

In step S101, a glass ribbon carried with glass passes through a forced convection area of an annealing lehr. Glass to be cooled is placed on the glass ribbon. Conveying rollers moves the glass ribbon to pass through the forced convection area.

In step S102, a cooling unit is used to cool the glass on the glass ribbon while the glass ribbon passes through the forced convection area. The cooling unit takes advantage of an air cooling effect to cool the glass on the glass ribbon while the glass ribbon passes through the forced convection area, so as to enable temperature of the glass to gradually decrease with time.

In step S103, the glass is air-cooled by forming different air volume according to the glass temperature, such that the glass is subjected to isothermal drop speed cooling in a moving process. In the cooling method according to the present invention, in a process of air-cooling the glass in the forced convection area while the glass ribbon is moved, a plurality of different air volume are set along a moving direction of the glass ribbon to air-cool the glass.

Glass temperature is Tg, air temperature is Ta, convection heat exchange coefficient is $\alpha$, heat exchange area is F and convection heat exchange quantity is Q, where $Q=\alpha*F*(Tg-Ta)$. Since glass Tg gradually decreases from the front to the rear, Ta is constant, temperature difference (Tg-Ta) gradually decreases accordingly. By gradually increasing the air volume and air speed, the convection heat exchange coefficient α increases and thereby the heat exchange quantity from the front to the rear trends to be equal.

The air volume corresponds to the glass temperature. With the moving of the glass ribbon, the glass temperature on the glass ribbon gradually decreases. If cooling air temperature is constant, the temperature difference between the glass ribbon and the cooling air gradually decreases, so that the temperature drop speed decreases along the moving direction of the glass ribbon. In the present invention, a plurality of different air volume are set to air-cool the glass, the air cooling volume from the front to the rear gradually increases and thereby the temperature drop speed from the front to the rear trends to be uniform. Accordingly, the air volume for air-cooling the glass in the present invention increases along the moving direction of the glass ribbon.

In this embodiment, the upper and lower parts of the glass ribbon are provided with multi-row air nozzles, which are supplied with air by air blowers to blow the glass ribbon with hot air or room-temperature cold air to cool the glass on the glass ribbon. However, it should be understood that the air cooling in the present invention is not limited to such mode, and any suitable air cooling mode is also available.

Accordingly, the size of the opening section of the multi-row air nozzles is increased along the moving direction of the glass ribbon, so that the air volume is increased along the moving direction of the glass ribbon. Since the size of the opening section of the air nozzles gradually is increased, the cooling air volume from the front to the rear is gradually increased, so that the temperature drop speed of a glass plate from the front to the rear trends to be uniform.

The opening section of the air nozzles may be of a slit type with a slit width of a. In other embodiments, the opening section of the air nozzles may be of a hole type with a hole diameter of d. Accordingly, along the moving direction of the glass ribbon, the specification size (a, d) of the opening section of the multi-row air nozzles longitudinally arranged is gradually increased, the cooling air volume from the front to the rear is gradually increased and thereby the temperature drop speed of the glass plate from the front to the rear trends to be uniform.

In preferred embodiments, the increase is continuous increase. For example, along the moving direction of the glass ribbon, the size of the opening section of a rear air nozzle is larger than that of a front air nozzle.

In another embodiment, the increase is periodic increase. For example, the plurality of air nozzles are divided into a first area, a second area and a third area along the moving direction of the glass ribbon. The size of the opening section of the plurality of air nozzles in the first area is smaller than that in the second area. The size of the opening section of the plurality of air nozzles in the second area is smaller than that in the third area. However, the size of the opening section of the plurality of air nozzles in each of the first area, the second area and the third area is the same.

As illustrated in FIG. 2, when a traditional cooling method is used, the temperature drop speed of the glass ribbon is quicker at the front and slower at the rear, as illustrated by curve 12. After the present invention is implemented, the temperature drop speed of the glass ribbon at the front and the rear trends to be uniform, as illustrated by curve 11. Curve 13 in FIG. 2 represents cooling air temperature.

Figure 3:
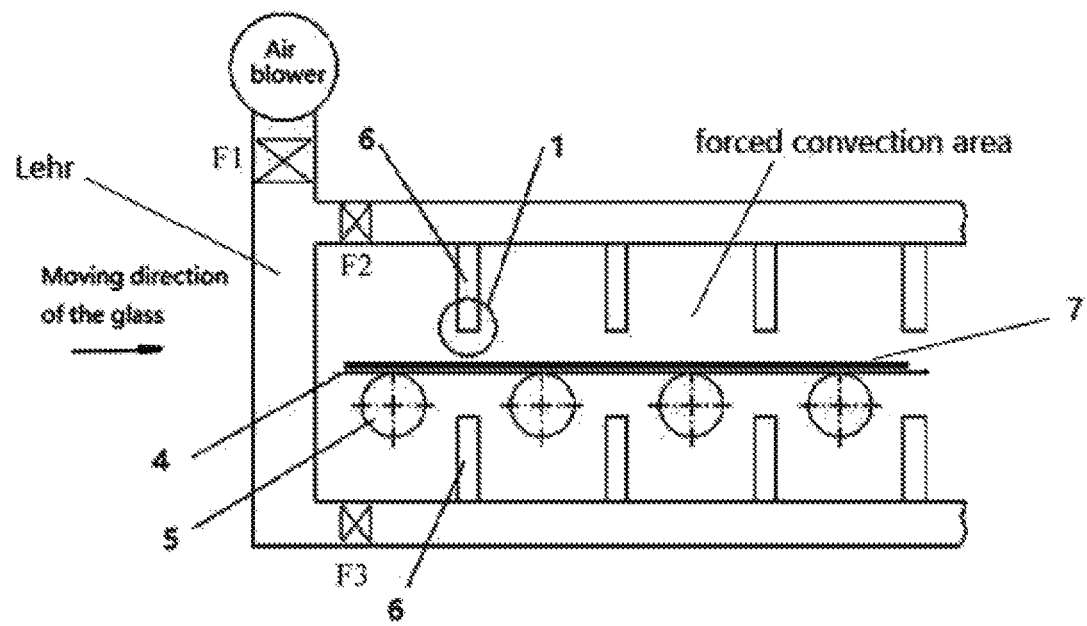
FIG. 3 illustrates a schematic view of a cooling apparatus according to the embodiment of the present invention.
Figure 4:
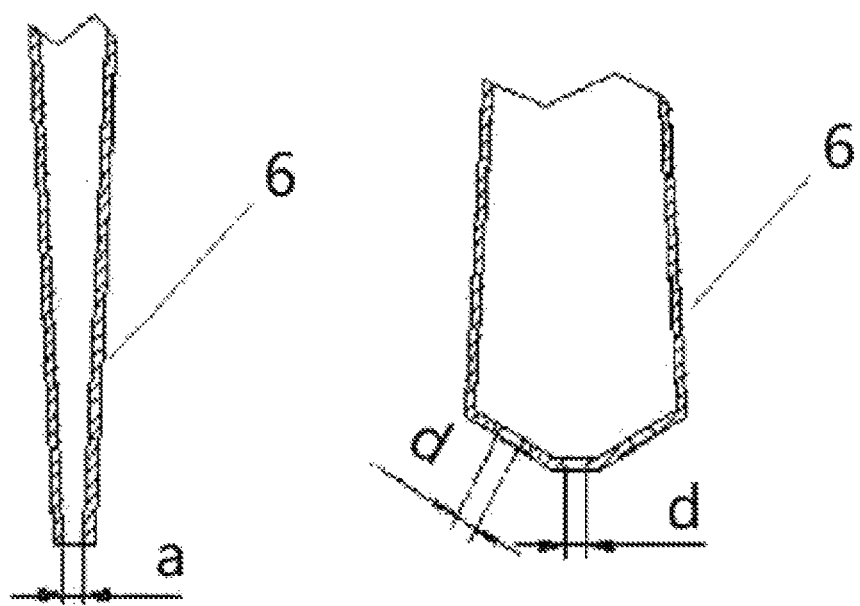
FIG. 4 illustrates a schematic view of an air nozzle type and specification size of the cooling device in FIG. 3.

With reference to FIG. 3 and FIG. 4, an isothermal drop speed cooling apparatus for a forced convection area of a glass annealing lehr according to the present invention will be described in detail. The apparatus achieves the purpose of air cooling by blowing air to glass which passes through the forced convection area of the annealing lehr.

As illustrated in FIG. 3, the isothermal drop speed cooling apparatus for the forced convection area of the glass annealing lehr according to the present invention comprises a glass ribbon for placing glass to be cooled thereon and conveying rollers for moving the glass ribbon.

A cooling unit cools the glass on the glass ribbon along with the movement of the glass ribbon. The cooling unit cools the glass on the glass ribbon while the glass ribbon passes through the forced convection area. The cooling unit cools the glass on the glass ribbon by taking advantage of an air cooling effect while the glass ribbon passes through the forced convection area, so as to enable glass temperature to gradually decrease with time.

The cooling unit air-cools the glass by forming different air volume according to the glass temperature, so that the glass is subjected to isothermal drop speed cooling in a moving process. The air volume corresponds to the glass temperature. With the movement of the glass ribbon, the temperature of the glass on the glass ribbon gradually decreases. If cooling air temperature is constant, the temperature difference between the glass ribbon and the cooling air gradually decreases. Therefore, the temperature drop speed decreases along the moving direction of the glass ribbon. In the present invention, a plurality of different air volume are set to air-cool the glass, the air cooling volume from the front to the rear gradually increases and thereby the temperature drop speed from the front to the rear trends to be uniform. Accordingly, the air volume for air-cooling the glass in the present invention increases along the moving direction of the glass ribbon.

In this embodiment, the upper and lower of the glass ribbon are provided with multi-row air nozzles, which are supplied with air by air blowers to blow the glass ribbon with hot air or room-temperature cold air to cool the glass on the glass ribbon. However, it should be understood that the air cooling in the present invention is not limited to such mode, and any suitable air cooling mode is also available.

Accordingly, the size of the opening section of the multi-row air nozzles is increased along the moving direction of the glass ribbon, so that the air volume is increased along the moving direction of the glass ribbon. Since the size of the opening section of the air nozzles is gradually increased, the cooling air volume from the front to the rear is gradually increased, so that the temperature drop speed of a glass plate from the front to the rear trends to be uniform.

The opening section of the air nozzles may be of a slit type with a slit width of a. In other embodiments, the opening section of the air nozzles may be of a hole type with a hole diameter of d. Accordingly, along the moving direction of the glass ribbon, the specification size (a, d) of the opening section of the multi-row air nozzles longitudinally arranged is gradually increased, the cooling air volume from the front to the rear is gradually increased and thereby the temperature drop speed of the glass plate from the front to the rear trends to be uniform.

In preferred embodiments, the increase is continuous increase. For example, along the moving direction of the glass ribbon, the size of the opening section of a rear air nozzle is larger than that of a front air nozzle.

In another embodiment, the increase is periodic increase. For example, the plurality of air nozzles are divided into a first area, a second area and a third area along the moving direction of the glass ribbon. The size of the opening section of the plurality of air nozzles in the first area is smaller than that in the second area. The size of the opening section of the plurality of air nozzles in the second area is smaller than that in the third area. However, the size of the opening section of the plurality of air nozzles in each of the first area, the second area and the third area is the same.

Hereinafter, an example of using the cooling apparatus according to the embodiment of the present invention to implement the cooling method according to the embodiment of the present invention will be described in detail.

As illustrated in FIG. 3, a glass ribbon 4 is conveyed from the front to the rear through conveying rollers 5, air nozzles 6 arranged at the upper and lower parts of the glass ribbon 4 are supplied with air by air blowers, to cool the glass plate 7 by blowing with hot air or room-temperature cold air. The specification size a, d of the opening section of the multi-row air nozzles longitudinally arranged is gradually increased from the front to the rear, the cooling air volume is gradually increased from the front to the rear, thereby allowing the temperature drop speed of a glass plate to be uniform from the front to the rear.

The opening section 21 of the air nozzles 6, as illustrated in FIG. 3, may be of a slit type with a slit width of a. In some embodiments, the slit width is about 6 mm, 8 mm or 10 mm respectively.

The opening section 20 of the air nozzles 6 may also be of a hole type with a hole diameter of d. In some embodiments, the hole 20 diameter is about Φ9.5 mm, Φ11 mm or Φ12.5 mm respectively.

According to the cooling method and apparatus provided in the present invention, the specification size of the opening section of multi-row air nozzles longitudinally arranged is increased along the moving direction of the glass ribbon, so that the cooling air volume from the front to the rear can be gradually increased, thereby allowing the temperature drop speed of a glass plate to be uniform from the front to the rear. The cooling method improves the phenomenon of that the cooling speed of the traditional glass ribbon is high at the front and low at the rear.

The preferred embodiments of the present invention are described above in detail. It should be understood that one skilled in the art may make various modifications and variations according to the concept of the present invention without any creative labor. Technical solutions which can be obtained by one skilled in the art according to the concept of the present invention through logic analysis, reasoning or limited experiments on the basis of the prior art shall be all included in the protection scope determined by the claims.

What is claimed is:

1. An isothermal drop speed cooling apparatus for a forced convection area of a glass annealing lehr, comprising:
   a glass ribbon for placing glass to be cooled thereon;
   a plurality of conveying rollers for moving the glass ribbon;
   an air blower for providing air for cooling the glass;
   a ventilation duct for connecting the air blower with a plurality of air nozzles;
   the plurality of air nozzles configured for cooling the glass on the glass ribbon along a moving direction of the glass ribbon from front-to-rear;
   wherein, sizes of opening sections of the air nozzles are increased along the moving direction of the glass ribbon from front-to-rear, so that the air volume is increasing along the moving direction of the glass ribbon, such that the glass is subjected to isothermal drop speed cooling while moving in the moving direction.

2. The isothermal drop speed cooling apparatus according to claim 1, wherein, the air nozzles are arranged at upper and lower parts of the glass ribbon.

3. The isothermal drop speed cooling apparatus according to claim 1, wherein, opening sections of the air nozzles are increased continuously.

4. An isothermal drop speed cooling apparatus for a forced convection area of a glass annealing lehr, comprising:
   a glass ribbon for placing glass to be cooled thereon;
   a plurality of conveying rollers for moving the glass ribbon;
   an air blower for providing air for cooling the glass;
   a ventilation duct for connecting the air blower with a plurality of air nozzles;
   the plurality of air nozzles configured for cooling the glass on the glass ribbon along a moving direction of the glass ribbon from front-to-rear;
   wherein, the air nozzles are divided into a first area, a second area and a third area along the moving direction of the glass ribbon, the size of opening section of the air nozzles in the first area is smaller than that in the second area, and the size of the opening section of the air nozzles in the second area is smaller than that in the third area, and the size of the opening section of the air nozzles in each of the respective first area, second area, and third area is the same.

\* \* \* \* \*